United States Patent [19]

Asano et al.

[11] Patent Number: 4,621,542
[45] Date of Patent: Nov. 11, 1986

[54] SPEED CHANGE CONTROL DEVICE FOR CONTINUOUSLY VARIABLE TRANSMISSION

[75] Inventors: Toshihiko Asano; Tatsuaki Takigawa, both of Nagano, Japan

[73] Assignee: Ishikawajima-Shibaura Machinery Co., Ltd., Tokyo, Japan

[21] Appl. No.: 673,342

[22] Filed: Nov. 20, 1984

[30] Foreign Application Priority Data

Jun. 13, 1984 [JP]  Japan ............... 59-121258

[51] Int. Cl.$^4$ ............... F16H 15/50; F16H 15/16
[52] U.S. Cl. ............... 74/796; 74/191
[58] Field of Search ............... 74/691, 796, 690, 191, 74/190, 190.5

[56] References Cited

U.S. PATENT DOCUMENTS

| | | | |
|---|---|---|---|
| 3,793,910 | 2/1974 | Nasvytis | 74/690 X |
| 4,112,779 | 9/1978 | Kemper et al. | 74/191 |
| 4,152,945 | 5/1979 | Kemper | 74/191 |
| 4,174,640 | 11/1979 | Dickinson | 74/690 |
| 4,185,509 | 1/1980 | McLarty | 74/690 X |
| 4,192,201 | 3/1980 | McCoin | 74/690 |
| 4,233,851 | 11/1980 | Kemper | 74/690 X |
| 4,270,415 | 6/1981 | Dickinson et al. | 74/690 X |
| 4,277,982 | 7/1981 | Kemper | 74/191 |
| 4,296,647 | 10/1981 | Kemper | 74/690 |

Primary Examiner—Kenneth J. Dorner
Assistant Examiner—David Novais
Attorney, Agent, or Firm—Oblon, Fisher, Spivak, McClelland & Maier

[57] ABSTRACT

A speed change control device for a continuously variable transmission has a carrier adapted to rotate about a predetermined axis, a twin cone adapted to rotate integrally with the carrier while being held by the carrier and rotatable about a central axis which is inclined with respect to the predetermined axis, and a pair of track rings disposed around the outer periphery of the carrier and movable along the predetermined axis. A part of the inner peripheral surface of each track ring is in frictional engagement with the outer peripheral surface of the twin cone. A screw shaft having left-hand threads of a large lead angle on one half and right-hand threads of a large lead angle on the other half is provided rotatably about the axis thereof in parallel with the predetermined axis, a nut on one track ring being engaged with the left-hand thread portion and a nut on the other track ring engaged with the right-hand thread portion so that with rotation of the screw shaft both track rings are moved in opposite directions. The lead angle of the threads of the screw shaft is set large so that the screw shaft is rotated also by axial forces acting on the track rings, the fore end portion of a rod of a hydraulic cylinder adapted to slide in parallel with the above predetermined axis is connected to one track ring so that a sliding motion of the rod causes a force to be applied to the one track ring, thereby allowing the screw shaft to rotate to move both track rings in opposite directions.

5 Claims, 3 Drawing Figures

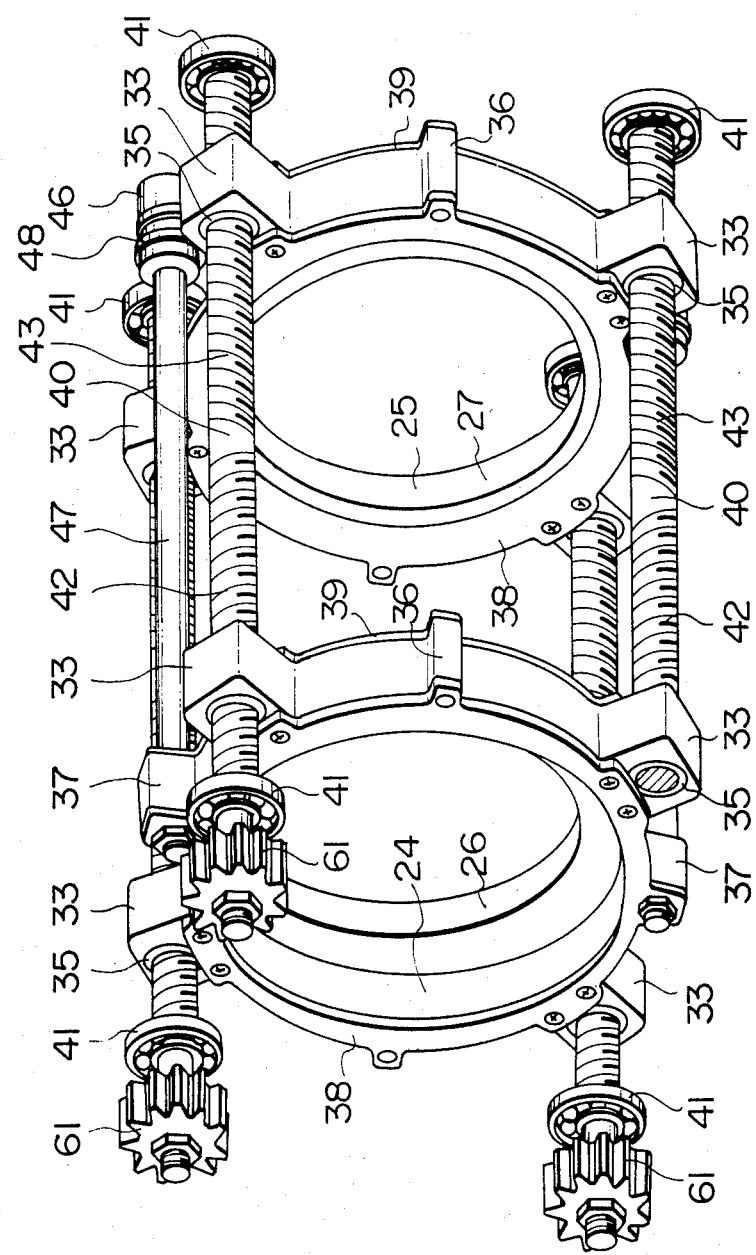

SPEED CHANGE CONTROL DEVICE FOR CONTINUOUSLY VARIABLE TRANSMISSION

BACKGROUND OF THE INVENTION

1. Field of the Invention

The present invention relates to a speed change control device for a continuously variable transmission for performing a continuous speed change by moving track rings.

2. Description of the Prior Art

Heretofore, there has been well known a continuously variable transmission having a carrier adapted to rotate about an axis thereof, a twin cone adapted to rotate integrally with the carrier while being held by the carrier and rotatable about a central axis intersecting the said axis, and a pair of track rings which are in frictional engagement with the outer peripheral surface of the twin cone, in which the track rings are moved along the axis of the carrier to change their position of engagement with the outer peripheral surface of the twin cone thereby performing a continuous speed change. In such a continuously variable transmission, a feed screw having left-hand threads on one side and right-hand threads on the other side is disposed in parallel with the axis of the carrier, and one track ring is engaged with the left-hand thread portion of the feed screw, while the other track ring is engaged with the right-hand thread portion of the feed screw. And by rotating the feed screw about its axis, the paired track rings are moved in directions approaching each other or in directions going away from each other at the same speed by the same distance.

Generally such feed screw is rotated manually or by means of a motor through gears. But, it is necessary to provide a large space for mounting a gear mechanism which transmits the rotation of the motor or other drive means to the feed screw. This has been an obstacle to the reduction in size of the continuously variable transmission.

As means for moving track rings, utilization of oil pressure without using the above feed screw has also been proposed (see Japanese Patent Publication No. 500569/82 . . . International Application PCT US80 00449 and Japanese Patent Publication No. 500981/82 . . . International Application No. PCT US80 03369). In the use of oil pressure, however, it is difficult to move a pair of track rings equally, and a difference in the amount of movement between both track rings would cause slip at the portion of frictional engagement of the track rings with the outer peripheral surface of the twin cone, which makes it impossible to perform an accurate speed change control and which may cause damage of the device.

SUMMARY OF THE INVENTION

It is the first object of the present invention to reduce the size of device.

It is the second object of the present invention to perform an accurate continuous speed change.

Other objects of the present invention will become apparent from the following description.

BRIEF DESCRIPTION OF THE DRAWINGS

FIG. 3 is a perspective view showing track rings, screw shafts, etc.

DESCRIPTION OF A PREFERRED EMBODIMENT

Figure 1:
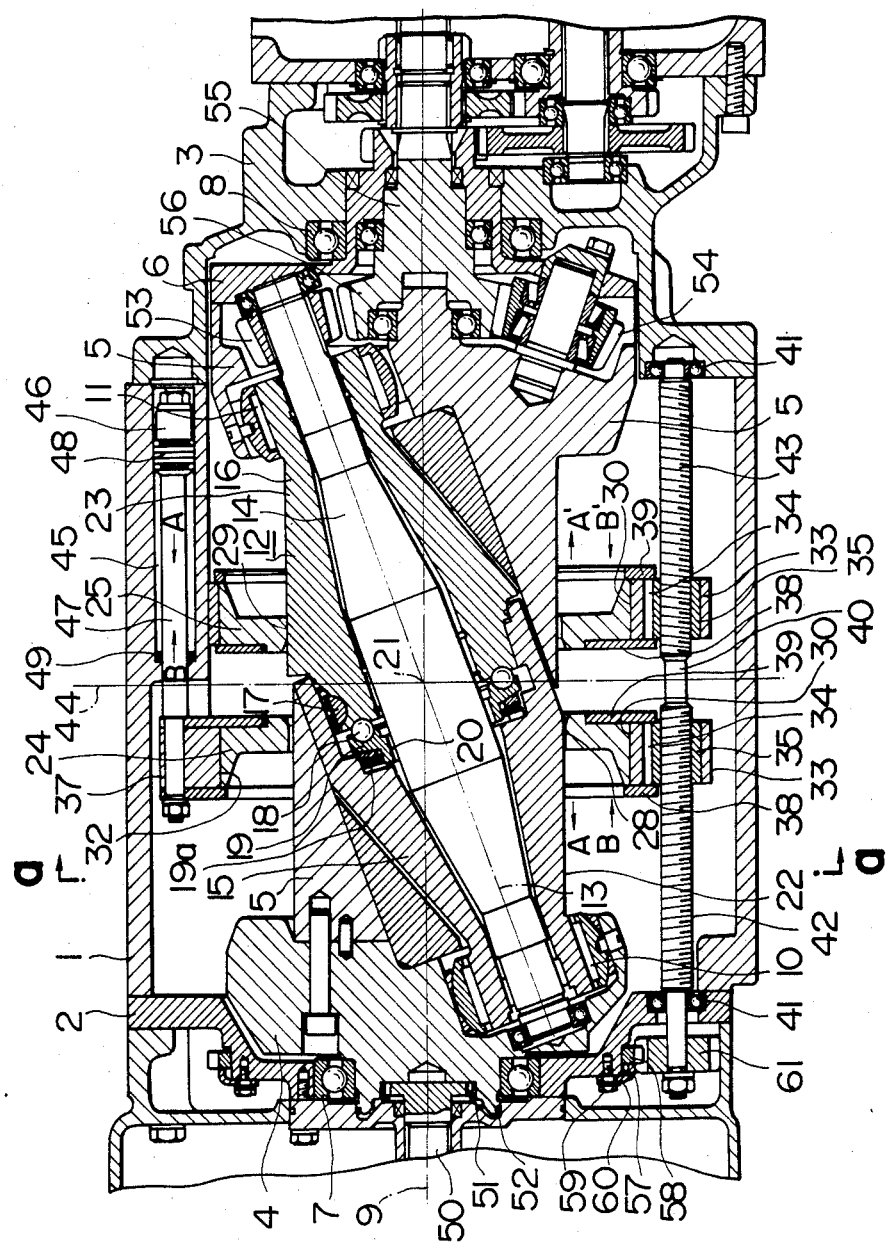
FIG. 1 is a longitudinally sectional side view of a speed change control device for a continuously variable transmission according to an embodiment of the present invention.

An embodiment of the present invention will be described below on the basis of the drawings.

To both ends of a hollow case 1 are fixed cases 2 and 3, and carriers 4, 5 and 6 fixed to each other are supported within the case rotatably about an axis 9 through bearings 7 and 8. A twin cone 12 is held by the carriers 4 and 5 through bearings 10 and 11, the twin cone 12 being rotatable about a central axis 13 which is inclined by a predetermined angle relative to the axis 9. The twin cone 12 comprises a centrally positioned shaft 14, a pair of cones 15 and 16, a connection member 17 for interconnecting the cones 15 and 16, a joint 19 connected to one cone 16 through balls 18, and a spring member 19a which urges the cones 15 and 16 in directions away from each other. The joint 19 is engaged with a toothed portion 20 formed on the outer periphery of a central part of the shaft 14. The conical surfaces of the twin cone 12 are symmetrical with respect to a point of intersection 21 between the axis 9 and the central axis 13, and generating lines 22 and 23 on the conical surfaces are parallel to the axis 9.

Figure 2:
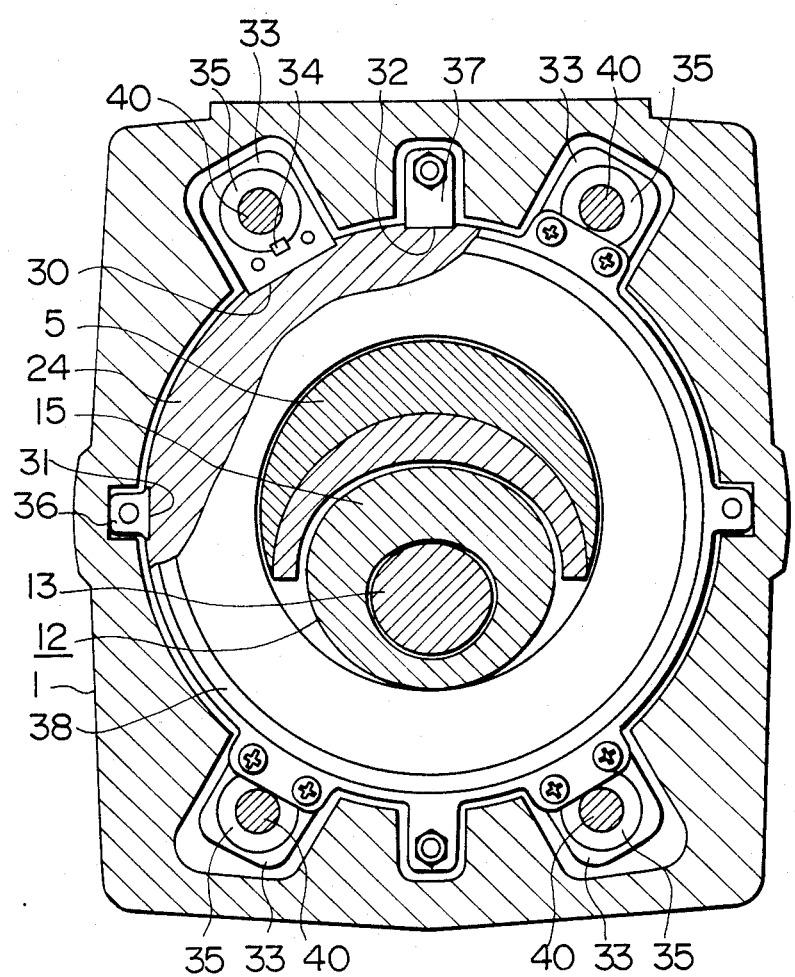
FIG. 2 is a sectional view taken on line a—a in FIG. 1.

Within the case 1 are mounted a pair of track rings 24 and 26 on the outer peripheries of the carrier 5 and the twin cone 12. The inner peripheral surfaces of the track rings 24 and 25 are formed as convex annular rolling surfaces 26 and 27 centered on the axis 9. The rolling surface 26 is in frictioal engagement with a point 28 on the generating line 22, while the rolling surface 27 is in frictional engagement with a point 29 on the generating line 23. The frictional engagement points 28 and 29 are positioned symmetrically with respect to the intersecting point 21. On the outer peripheral surfaces of the track rings 24 and 25 are formed a plurality of notched portions 30, 31 and 32. In two pairs of notched portions 30, each pair being spaced by 180 degrees, are inserted holding pieces 33 one for each notched portion, and a nut 35 swivel-stopped with a key 34 is held by each holding piece 33. In each of a pair of notched portions 31 is inserted a key 36 for swivel-stop of the track rings 24 and 25 with respect to the case 1 as shown in FIG. 2. A pair of notched portions 32 are formed only in one track ring 24, and a holding piece 37 is inserted in each of them. The holding pieces 33 and 37, the keys 36 and the nuts 35 are prevented from coming off by plates 38 and 39 which are fixed to both ends of the track rings 24 and 25.

Within the case 1 are mounted four screw shafts 40 whose axis are parallel to the axis 9, the screw shafts 40 each having right-hand threads at a lead angle of 45-deg. On the left half side and left-hand threads at a lead angle of 45-deg. on the right half side. Each screw shaft 40 is held by bearings 41 at both end portions thereof. Right-hand thread portion 42 and left-hand thread portion 43 of each screw shaft 40 are symmetric with respect to a plane 44 which passes through the intersecting point 21 and intersects the axis 9 perpendicularly as shown in FIG. 1. And in positions spaced equally from the plane 44, the right-hand thread portion 42 is engaged with a nut 35 on the track ring 24, and the left-hand thread portion 43 is engaged with a nut 35 on the track ring 25.

On the right-hand inner peripheral portion of the case 1 are formed by molding a pair of hydraulic cylinders 45 in positions spaced 180 degrees from each other. In each hydraulic cylinder 45 are enclosed a piston 46 and a rod 47 adapted to slide in parallel with the axis 9, as well as a piston seal 48 and a rod seal 49. The fore end portion of the rod 47 is fixed to the holding piece 37.

On the axis 9 is mounted and input shaft 50 which is connected to an engine (not shown) through a clutch (not shown). And a gear 51 formed on an end portion of the input shaft 50 is in mesh with an internal gear 52 formed in the carrier 4. A planet gear 53 is splined to one end of the shaft 14, and it is in mesh with a gear 56 of an output shaft 55 through an idler gear 54 journalled in the carrier 6. In a stepped portion 57 of the case 2 is inserted an annular gear 58 rotatably at a predetermined fitting. The gear 58 is held so as not to move in the direction of the axis 9 by means of a plate 60 which is fixed with bolts 59 to the case 2, and it is in mesh with a gear 61 fixed to an end portion of the screw shaft 40.

In the above construction, power is transmitted from the input shaft 50 to the output shaft 55 in the following manner. Upon rotation of the input shaft 50, the carriers 4, 5, 6 and the twin cone 12 rotate integrally about the axis 9. At this time, the frictional engagement of the convex annular rolling surfaces 26 and 27 with the twin cone 12 on the generating lines 22 and 23 causes the twin cone 12 to rotate about the central axis 13. This rotation, coupled with the rotation about the axis 9, causes rotation of the gear 56 which is in mesh with the planet gear 53 through the idler gear 54, and hence the output shaft 55 rotates. And by moving the track rings 24 and 25 along the axis 9 to shift the frictional engagement points 28 and 29, the rotating speed of the twin cone 12 can be changed continuously, thus permitting a continuous speed change for the output shaft 55.

The movement of the track rings 24 and 25 along the axis 9 will now be explained. A hydraulic circuit (not shown) is connected to each hydraulic cylinder 45 to slide the piston 46 and the rod 47 hydraulically in parallel with the axis 9. As to the hydraulic unit, since the continuously variable transmission is already provided with a hydraulic unit for lubrication, it is not necessary to separately provide it. When oil pressure is applied to slide the piston 46 and the rod 47 in the direction of arrow A, the track ring 24 moves in the same direction, and at the same time the screw shafts 40 each threaded at a lead angle of 45-deg. rotate about their axes, so that the track ring 25 moves in the opposite direction (A' direction). The amount of movement of the track ring 24 in the direction of arrow A and that of the track ring 25 in the direction of arrow A' are equal, so the track rings 24 and 25 are maintained in their symmetric positional relation with respect to the plane 44, and the frictional engagement points 28 and 29 after the movement are also maintained in their symmetric positional relation with respect to the intersecting point 21.

On the other hand, when oil pressure is applied to slide the piston 46 and the rod 47 in the direction of arrow B, the track ring 24 moves in the direction of arrow B and the screw shafts 40 rotate in the opposite direction, while the track ring 25 moves in the direction of arrow B'. Also in this case, the amount of movement of the track ring 24 and that of the track ring 25 are equal, and so the symmetric positional relations relative to the plane 44 and the intersecting point 21 are maintained.

Thus, not a gear mechanism but the hydraulic cylinders 45 provided in the case 1 are used as means for moving the track rings 24 and 25 and rotating the screw shafts 40 in the manner described above. Consequently, reduction in size of the continuously variable transmission can be attained. Moreover, it is not the paired track rings 24 and 25 but one track ring 24 that is moved directly by oil pressure, and the other track ring 25 is moved by the screw shafts 40 which rotate with movement of the track ring 24. Consequently the amount of movement of both track rings 24 and 25 can be controlled accurately. Further, in comparison with the conventional construction, the speed change control device of the present invention employs the hydraulic cylinders 45 in place of a gear mechanism and employs the screw shafts 40 having threads of a large lead angle, and thus its structure is simple.

During rotation of the screw shafts 40, the four screw shafts 40 are rotated in synchronism with one another because the gears 61 fixed to end portions of the screw shafts 40 are in mesh with the gear 58, and consequently the track rings 24 and 25 are moved smoothly.

What is claimed is:

1. A speed change control device for a continuously variable transmission, comprising:

a carrier adapted to rotate about a predetermined axis, a twin cone held by said carrier by means permitting said twin cone to rotate integrally with said carrier about said predetermined axis and to rotate about a central axis which is inclined with respect to said predetermined axis, a pair of track rings disposed around the outer periphery of said carrier and mounted for movement along said predetermined axis, a part of the inner peripheral surface of each said track ring being in frictional engagement with the outer peripheral surface of said twin cone, and means for moving said track rings and maintaining said track rings in symmetric positions with respect to a point of intersection of said predetermined axis and said central axis, said means for moving and maintaining comprising:

(a) a screw shaft having an axis parallel to said predetermined axis and mounted for rotation about said axis thereof, said screw shaft having left-hand threads of a large lead angle on one half thereof and right-hand threads of a large lead angle on the other half thereof, the left-hand thread portion of said screw shaft being in threaded engagement with one said track ring and the right-hand thread portion of said screw shaft being in threaded engagement with the other track ring, and (b) a hydraulic cylinder having a rod adapted to slide in parallel with said predetermined axis, a fore end portion of said rod being directly connected to only one of said track rings, whereby said one of said track rings is moved by said rod and said other track ring is moved by said screw shaft.

2. A speed change control device for a continuously variable transmission according to claim 1, wherein projections for preventing rotation are formed on the outer peripheries of said track rings, said projections being fitted in grooves formed in a case.

3. A speed change control device for a continuously variable transmission according to claim 1, including a plurality of said screw shafts disposed in parallel with each other and threadedly engaged with the right and left track rings.

4. A speed change control device for a continuously variable transmission according to claim 3, including a gear fixed to an end portion of each of said screw shafts, said gears being threadedly engaged with the outer periphery of an annular gear which is mounted for rotation about said predetermined axis, whereby said screw shafts rotate together.

5. A speed change control device for a continuously variable transmission according to claim 1, wherein said hydraulic cylinder is integrally formed with a case for said device.

* * * * *